Nov. 14, 1944.    M. C. WHITMORE    2,362,602
HYDRAULIC POWER TRANSMISSION PUMP OR MOTOR
Filed May 15, 1939    2 Sheets-Sheet 1

INVENTOR
M.C. WHITMORE.
BY
ATTORNEYS

Nov. 14, 1944.  M. C. WHITMORE  2,362,602
HYDRAULIC POWER TRANSMISSION PUMP OR MOTOR
Filed May 15, 1939   2 Sheets-Sheet 2

INVENTOR
M.C. WHITMORE.
BY
ATTORNEYS

Patented Nov. 14, 1944

2,362,602

UNITED STATES PATENT OFFICE 2,362,602

HYDRAULIC POWER TRANSMISSION PUMP OR MOTOR

Max C. Whitmore, Chicago, Ill.

Application May 15, 1939, Serial No. 273,804

9 Claims. (Cl. 103—120)

This invention relates to the hydraulic transmission of power, and more particularly to a hydraulic transmission system comprising rotary hydraulic pumps or motors and control means therefor whereby the volume or output of the driving pump or motor may be regulated to vary the power transmitted thereby and consequently to vary the speed of the driven pump or motor.

It is a primary object of the invention to provide a hydraulic transmission system comprising driving and/or driven units in which vibration and leakage of fluid are substantially eliminated or reduced to a minimum, and to provide control means for such units which is simple in construction, efficient in operation, and enables smooth, positive, and rapid variation in volume of output, or volume of power transmitted, without noticeable sudden pulsation or surge incident to such variation in the volume of output.

A further object of the invention is the provision of a hydraulic pump or motor and control means therefor in a self-contained unit.

A further object of the invention is the provision of a hydraulic pump or motor and control means therefor in a self-contained unit, in which the control means is readily variable in a manner substantially free from friction.

Another object of the invention is to provide control means comprising a variable core which is supported within its housing upon bearings providing substantially equal support in all directions.

It is a further object of the invention to provide control means for hydraulic pumps or motors comprising a variable core in which the means for supporting said core within its housing acts to determine the direction of flow of fluid through said control means.

Still another object of the invention is the provision of a self-contained unit comprising a hydraulic pump or motor and control means therefor in which means are provided for the equalization of fluid pressure in all directions within and without the rotatable part of said control means.

Still another object of the invention is the provision of a self-contained unit comprising a hydraulic pump or motor and control means therefor in which the variable member or core comprises the housing for the movable parts of the motor.

Another object of the invention is the provision of a hydraulic pump or motor of the rotary type availing of pistons having broad sealing surfaces for contact with the inner wall of the casing to prevent leakage of fluid.

Another object of the invention is the provision of a hydraulic pump or motor having pistons so associated with their rotor as to be supported directly from the center thereof whereby to provide said rotor with greater leverage to withstand higher starting torque and to provide a stronger construction than was heretofore possible.

A still further object of the invention is the provision of a rotary hydraulic pump or motor availing of stationary means for positively maintaining the pistons in contact with the housing at all stages of rotation.

Other objects, advantages and features of novelty will appear more fully as the description of the invention progresses in conjunction with the accompanying drawings in which.

Figures 1, 11:
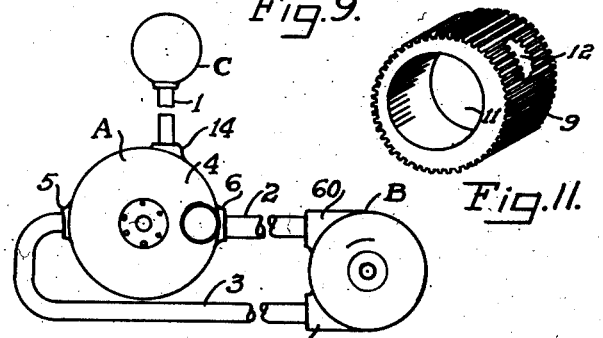
Figure 1 is a diagrammatic view of a system embodying the features of the present invention.
Figure 11 is a perspective view of the control sleeve.

Now referring to the drawings for a detailed description of the present invention, Figure 1 shows in a diagrammatic manner a complete hydraulic transmission system embodying the features of the present invention, including a self-contained unit A comprising a pump or motor unit of the invention and the control means therefor, in the present instance comprising the driving unit; a modified pump or motor unit B of the invention, in the present instance comprising the driven unit; a storage unit C having appropriate fluid connection, designated by the numeral 1, with the unit A; and appropriate fluid connections, designated 2 and 3 respectively, for inter-communication between the units A and B.

The unit A comprises a housing or casing 4 having diametrically opposed inlet and outlet ports 5 and 6, and a supply port 14, said casing having interiorly thereof a hollow cylindrical chamber 7, and the inner wall of said casing being provided with toothed serrations 8. Rotatably mounted within the chamber 7 is a cylindrical sleeve 9, the outer portion of which is serrated to provide the ridges or projections 10 constituting gear teeth, said sleeve 9 having a hollow cylindrical passage 11 formed eccentrically respecting the outer periphery of said sleeve. The sleeve 9 is provided with ports 12 and 13.

The sleeve 9 is rotatably supported within the casing or housing 4 upon bearing gears 15, 16, 17 and 18. The gears 16, 17 and 18 mesh with the teeth 8 and 10 respectively of the casing 4 and the sleeve 9 and move relatively to both the sleeve and the casing. The gear 15 comprises an actuating gear, the details of which are more particularly shown in Figure 6, the same being formed with a shaft portion 15a and spaced gear portions 15b and 15c.

Figure 4:
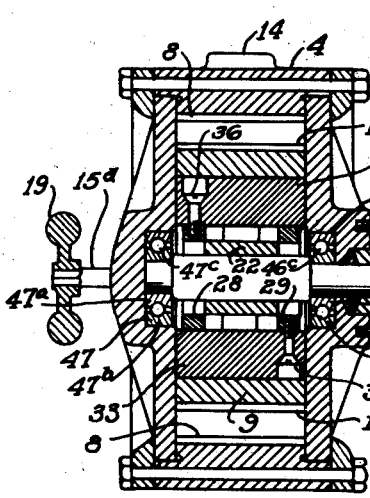
Figure 4 is a longitudinal sectional view on the line 4—4 of Figure 2.

The opposite ends of the shaft portion 15a are journaled in the housing 4 and one of said ends extends exteriorly of said housing, as indicated at 15d in Figure 4, the same having an actuating handle 19 secured thereto. The gear 15 being rotatably journaled in the housing, has a fixed position respecting the latter and its gear teeth engage only the sleeve and not the housing as distinguished from the gears 16, 17 and 18 which engage both the housing and sleeve and move relative to both. The housing 4 is recessed as at 4a at a point adjacent the location of gear 15 so that the latter will not engage said casing.

Figures 6, 7, 8:
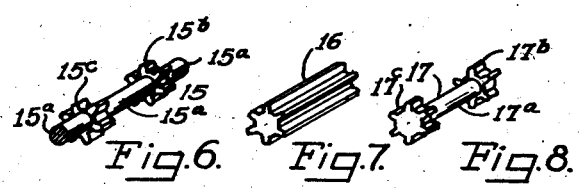
Figure 6 is a perspective view of the actuating gear for the control sleeve.
Figure 7 is a perspective view of one of the sealing bearing gears for supporting the control sleeve within its casing.
Figure 8 is a perspective view of another of the gears for supporting the control sleeve within its casing.
Figures 9, 10:
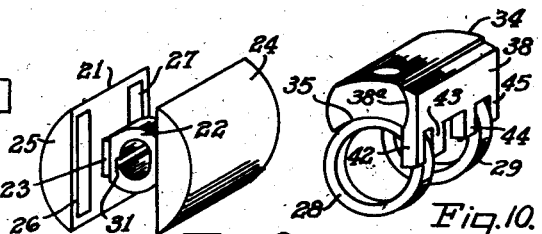
Figure 9 is a perspective view of a pump or motor rotor of the present invention.
Figure 10 is a perspective view showing the relation of the pistons, piston rings, and piston carriages of a pump or motor unit of the present invention.

The gears 16 and 18, one of which is shown more in detail in Figure 7, comprise sealing as well as bearing gears, while the gear 17 comprises a placement gear formed similarly to the actuating gear 15. Said placement gear 17 is formed with a shaft portion 17a and spaced gear portions 17b and 17c. Said placement gear 17 is not, however, like the gear 15, journaled in the housing 4, but said gear 17 is a floating gear in the same respect that gears 16 and 18 are floating gears.

Figure 2:
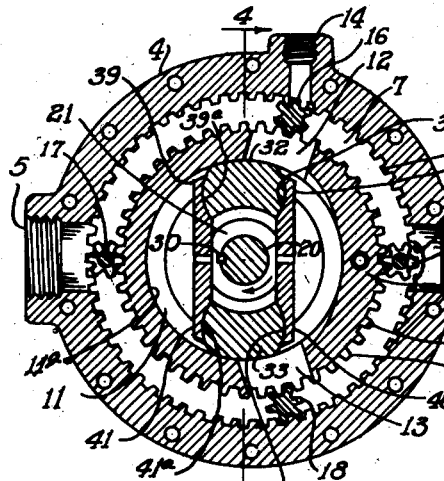
Figure 2 is a transverse sectional view through a unit comprising a rotary pump or motor and control means therefor of the present invention, showing the relative position of the control sleeve to its outer casing when the same is in neutral position.

A motor shaft 20 is journaled in the housing 4 upon spaced bearings 46 and 47, comprising inner bearing races 46a and 47a, tightly fitted on the shaft 20, outer bearing races 46b and 47b, tightly fitted against the inner wall of the housing 4, and ball bearings 46c and 47c operating between the respective inner and outer races of the bearings 46 and 47, said shaft being positioned concentrically respecting the bore of the housing 4 and also concentrically respecting the periphery of the sleeve 9. Because of the fact that said sleeve 9 has an eccentric bore, the inner wall 11a of said sleeve will assume varying degrees of eccentricity respecting shaft 20 depending on the degree of rotation of the sleeve from neutral position. Neutral position, as indicated in Figure 2, is the position of the sleeve 9 at which the inner wall 11a thereof is concentric with shaft 20.

Fixed to the shaft 20, is a rotor, generally indicated 21 comprising a hub portion 22, formed with lateral extensions 23 at opposite sides of said hub, contiguous with which lateral extensions 23 are formed the arcuate peripheral webs or vanes 24 and 25. The vanes 24 and 25 are each formed with arcuate recesses 26 and 27 with which the floating placement rings 28 and 29 are adapted to cooperate respectively. The rotor 21 is fixed to the shaft 20 by means of a key 30 cooperating with said shaft 20 and a keyway 31 in the hub portion 22 of said rotor.

Associated with the rotor 21 are oppositely disposed pistons 32 and 33 having arcuately curved outer surfaces 34, the curvature of which is an arc of a circle of substantially the same diameter as the inner wall of the sleeve 9. Said pistons 32 and 33 are formed with arcuately curved surfaces 35, adapted to cooperate with the placement rings 28 and 29, the curvature of said surfaces 35 being an arc of a circle of substantially the same diameter as the outer periphery of said placement rings 28 and 29. The pistons 32 and 33 are preferably, though not necessarily, respectively secured to the placement rings 28 and 29 by means of bolts 36 and 37 respectively cooperating with the said placement rings 28 and 29 respectively.

Each of the pistons 32 and 33 is engaged from opposite sides by oppositely disposed piston carriages 38 and 39, respecting the piston 32, and 40 and 41 respecting the piston 33. The piston carriages 38, 39, 40 and 41 are formed inwardly with curved surfaces 38a, 39a, 40a, and 41a, cooperating with and conforming to the curvature of the oppositely curved surfaces 32a and 33a of the pistons 32 and 33, and said piston carriages are provided with pairs of lugs 42 and 43 between which fit the placement ring 28. Said piston carriages are also provided with pairs of lugs 44 and 45 between which fit the placement ring 29. The piston carriages cooperate with the rotor hub since the lateral extensions 23 thereof extend between the lugs 43 and 44 of said piston carriages. In other words, the piston carriages ride upon the extensions 23 of the rotor hub.

In operation, when the shaft 20 is rotated, the pump or motor parts, comprising the rotor 21, pistons 32 and 33, piston carriages 38, 39, 40 and 41, and placement rings 28 and 29, rotate within the hollow chamber 11 of the sleeve 9. The association of placement rings 28 and 29 with the pistons 32 and 33 maintains the outer surfaces of the latter in contact with the inner wall of the sleeve. The inner wall of said sleeve 9 being eccentric respecting the shaft 20, the pistons 32 and 33 and the floating placement rings 28 and 29 will shift radially relative to the shaft 20 during rotation of the shaft 20.

Long leverage is applied to the pistons through the piston carriages from substantially the center of the rotor because of the fact that the extensions or lugs 43 and 44 of said piston carriages straddle and ride upon the lateral extensions 23 of said rotor.

Thus, extremely rigid and quite adequate support for the pistons from the center of the rotor is provided resulting in a very strong construction, capable of withstanding higher starting torque and capable of operating at higher speed with consequent increased output.

The bearing gears 15, 16, 17 and 18, which rotatively support the sleeve 9 within the casing 4, are so positioned relative to each other as to provide, as nearly as is possible, equalized supporting of said sleeve respecting said casing in all positions of rotation to which the sleeve is subjected. As above pointed out, the actuating gear 15 is stationary respecting the housing 4, and the other gears 16, 17 and 18 are movable or floating respecting the housing 4 and the sleeve 9, and since the gears 16, 17 and 18 will change positions respecting the actuating gear 15 when the sleeve 9 is rotated, it is important that the gears 16, 17 and 18 be properly positioned initially to take into account their relatively changed positions when the sleeve is rotated, to insure that the sleeve will at all times be adequately and substantially equally supported respecting the housing in all directions.

In addition to their function as supporting bearings for the sleeve 9 respecting the housing 4, the gears 16 and 18 have a sealing function in the determination of the flow of fluid through the unit A. Said gears 16 and 18 are, therefore, referred to as sealing bearing gears. In view of their sealing function in the determination of the direction of flow of fluid through the unit A, the positioning of said gears, respecting each other and also respecting the gears 15 and 17, is dependent upon, and determined by, not only the desirability of effecting equalized support of the sleeve 9 respecting the housing 4 under all conditions of rotation of said sleeve, but also by the positioning of the housing ports 5, 6 and 14, as well as the positioning of the sleeve ports 12 and 13.

By way of explanation, it may be pointed out that the sealing gears 16 and 18 must preferably be positioned centrally respecting the sleeve ports 12 and 13 when the sleeve 9 is in neutral position to permit flow of fluid to either side of said sealing bearing gears 16 and 18 between the sleeve 9 and housing 4. Since the original positioning of the sealing bearing gears 16 and 18 relative to each other and to the gears 15 and 17 must take into consideration the equalized supporting of the sleeve 9 respecting the housing 4, not only when the sleeve 9 is in neutral postion but also when the sleeve is rotated to other postions, it follows that the sleeve ports 12 and 13 must be positioned relative to each other and to the casing ports 5, 6 and 14, in such a manner that the sealing gears will be positioned centrally of said sleeve ports when the latter is in neutral position, and at the same time permit of a positioning of the sealing bearing gears 16 and 18 such that the same will be free to move a distance sufficient to permit the sleeve to be rotated from neutral position to fully open position permitting maximum volume or output in one direction.

The distance which the sleeve must rotate from neutral position, shown in Figure 2, to fully open position permitting maximum volume of fluid flow or output in one direction, is determined by the point at which the inner eccentric wall of the sleeve 9 comes in contact with the rotor vanes 24 and 25 during the rotation of the shaft 20. When the sleeve 9 is rotated to a position at which the rotor vanes 24 and 25 contact therewith, during rotation of the shaft 20, maximum output or degree of fluid flow in one direction will be effected, because the pistons 32 and 33 will be prevented from forcing oil past that point in the rotation of the rotor and said pistons will consequently exhaust a maximum output of fluid through a particular one of the sleeve ports 12 and 13. The particular one of the sleeve ports 12 and 13 through which the maximum volume of oil will be exhausted will, of course, depend upon the direction of rotation of the sleeve 9 from its neutral position.

Figure 3:
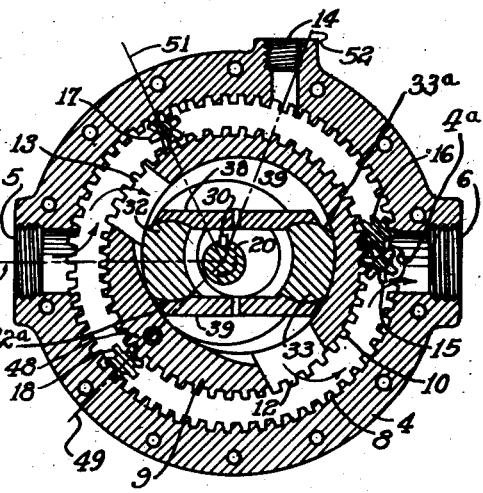
Figure 3 is a view similar to Figure 2 but showing the relation of the control sleeve to its outer casing when the same is positioned for maximum volume or output in one direction.

In the proportioning of the thickness of the wall of the sleeve 9, which determines the eccentricity of the inner chamber 11 of said sleeve respecting the shaft 20, which is the axis of the rotor 21, as indicated in Figures 2 and 3, it has been determined that when the thickest portion of the sleeve 9, indicated at 48, has been rotated a distance of 135 degrees from a point opposite the center of the actuating gear 15, the rotor vanes 24 and 25 will engage the inner wall of said sleeve 9 during the rotation of the rotor. When such condition exists, as above pointed out, the maximum volume of fluid is exhausted through one or the other of the sleeve ports depending upon the direction of rotation of the sleeve from neutral position.

Since the gears 16, 17 and 18 travel half as fast as the sleeve travels in rotation, and consequently move only one half the distance of a given point on the sleeve during rotation of said sleeve, the sealing gears are preferably positioned half way between the actuating gear and a point 135 degrees from said actuating gear, or approximately a distance of 67 degrees from said actuating gear, when the sleeve 9 is in neutral position as shown in Figure 2. Thus, the sleeve ports 12 and 13 which must be positioned so that the sealing gears 16 and 18 are in approximately the center thereof when the sleeve is in neutral position, are placed so that their centers are approximately 67 degrees from the thickest portion 48 of the sleeve 9. Since there is to be no positive flow of fluid when the sleeve 9 is in neutral position, the supply port 14 must also have its center opposite the center of one of the sealing gears 16 and 18 when the sleeve 9 is in neutral position. Thus, the supply port 14 will be arranged at a point approximately 67 degrees from the center of one of the inlet outlet ports 5 and 6.

In the embodiment of the invention shown in the accompanying drawings, the actuating gear 15 is placed opposite the center of the inlet outlet port 6. The sealing bearing gears 16 and 18 are positioned approximately 67 degrees in opposite directions from the center of the actuating gear 15. The sleeve ports 12 and 13 are positioned so that their centers are opposite the sealing bearing gear 16 and 18 when the sleeve 9 is in neutral position with its thickest portion 48 opposite the center of the actuating gear 15. The supply port 14 is positioned so that its center is opposite the center of the sealing bearing gear 16, when the sleeve 9 is in neutral position.

It will thus be seen that when the sleeve 9 is in neutral position as shown in Figure 2, the inner wall of the chamber 11 will be concentric with the shaft 20 and consequently concentric with the arcuate path of the vanes 24 and 25 of the rotor 21. When the shaft 20 is rotated under such condition, there will be no definite flow of fluid in any particular direction. There is nothing to direct the flow in any particular direction. Fluid may pass from the sleeve port 12 on either side of the gear 16 to and from the supply port 14 and between the sleeve 9 and the housing 4 in either direction toward the port 5 or toward the port 6.

Similarly, fluid may pass from the sleeve port 13 on either side of the sealing bearing gear 18 toward the inlet-outlet port 5 or the inlet-outlet port 6. Moreover, since the rotor vanes 24 and 25 are concentric with the inner wall of the sleeve 9 when the sleeve is in the position shown in Figure 2, said vanes will not cause the fluid to be compelled to flow in any particular direction and said fluid will merely be by-passed or churned without any directional flow when the shaft 20 is rotated.

When, however, the sleeve 9 is rotated to the position, indicated in Figure 3, by means of actuating gear 15 through rotation of handle 19, the thickest portion 48 of the sleeve 9 will be positioned at a point 135 degrees from the center of the actuating gear 15, as indicated by the line 49 in Figure 3. The sealing bearing gear 18 will concurrently have moved half the distance of any given point upon the sleeve 9 and consequently will be positioned opposite the thickest portion 48 of the sleeve 9 at a point such that the line 49, indicating the distance of 135 degrees from the actuating gear 15, will pass through the center of said sealing bearing gear 18. Concurrently the placement gear 17 will have moved a distance of approximately 67 degrees from the center of the inlet-outlet port 6, indicated by the line 50, to a point substantially 113 degrees, as indicated by the line 51, from the center of the actuating gear 15. Also concurrently the sealing bearing gear 16 will have moved a distance of approximately 67 degrees from the point of its neutral position, as indicated by the line 52, to its extreme point of movement at the end of the gear teeth 8 adjacent the actuating gear 15.

Thus, when the sleeve is positioned as indicated in Figure 3, the sleeve 9 will have substantially equalized support from three points, namely, by the gears 15 and 16 at a point substantially opposite the center of the inlet-outlet port 6; and by the gears 17 and 18 at the points indicated by the lines 49 and 50.

With the sleeve 9 positioned as shown in Figure 3, assuming that the shaft 20 is rotated in a clockwise direction respecting said figure, the pistons 32 and 33 will draw in fluid through the port 13 in the sleeve 9 and exhaust said fluid through the port 12 in said sleeve, because said pistons will be prevented from forcing fluid past the point indicated by the line 49 of the inner wall of the sleeve 9, on account of the proximity of the rotor vanes 24 and 25 to the sleeve at such point. Consequently the only avenue of escape for the fluid in front of the pistons 32 and 33 is through the sleeve port 12.

Fluid thus exhausted through the sleeve port 12 passes outwardly between the sleeve 9 and the casing 4. The pressure is equal and opposite in all directions. Some fluid may initially pass from the sleeve port 12 between the sleeve 9 and the housing 4 in the direction of the sealing bearing gear 18, positioned at the point indicated by the line 49. However, the fluid will be prevented by said sealing bearing gear 18 from passing beyond the point 49, and consequently the pressure created by the exhaustion of fluid from the sleeve port 12 will be exerted to cause the fluid so exhausted to flow in the direction of the arrows outwardly through the inlet-outlet port 6. Fluid so exhausted, of course, will be prevented by the presence of the sealing gear 16 from flowing any further than the position of said gear between the sleeve 9 and the casing 4.

Fluid exhausted through the inlet-outlet port 6, will pass to a point of use such, for instance, as in connection with the transmission system illustrated in Figure 1, through the pipe 2 to the inlet-outlet port 60 of the driven unit B, causing the pump or motor of said unit to be driven and subsequently being exhausted through the inlet-outlet port 61 of the unit B, through the fluid pipe 3, returning to the unit A through the inlet-outlet port 5.

Fluid under pressure entering the inlet-outlet port 5, in the direction of the arrows, will pass between the sleeve 9 and the housing 4. Since said fluid will be prevented from passing between the sleeve 9 and the housing 4 in either direction beyond the sealing gears 16 and 18 respectively, said fluid returning through the inlet-outlet port 5 will be caused to pass through the sleeve port 13 to be picked up by the pistons 32 and 33 during the rotation of the shaft 20 and exhausted through the sleeve port 12, as before described.

The operation just described resulted upon the rotation of the sleeve 9 135 degrees from its neutral position, indicated in Figure 1, in a clockwise direction. It will be obvious to those skilled in the art that if the sleeve 9 is rotated 135 degrees in a counterclockwise direction from its neutral position, indicated in Figure 2, that the fluid will be caused to flow in an opposite direction from that just described. In other words, fluid will enter through the inlet-outlet port 6, pass between the casing 4 of the sleeve 9, through the sleeve port 13 where it will be picked up by the pistons 32 and 33, assuming the shaft to be rotating in a clockwise direction, as before, exhausted through the sleeve port 12, passing again between the sleeve 9 and the casing 4, and outwardly through the inlet-outlet port 5.

It will be equally clear to those skilled in the art that when the sleeve 9 is rotated from its neutral position, indicated in Figure 2, to such a degree that fluid is prevented by the positioning of the sealing gears 16 and 18 from passing to the sleeve ports 12 and 13 from one direction or the other, that the positive flow of fluid through the unit A in one direction or the other will be effected depending upon the direction of rotation of the sleeve 9 from its neutral position. The pressure output, or volume of fluid, placed under pressure at any given time during rotation of the shaft 20 will depend upon the degree of rotation of the sleeve 9 in either direction between its neutral position and a position 135 degrees therefrom. Any degree of rotation of said sleeve 9 between its neutral position and the position 135 degrees therefrom will produce a condition of pressure output less than full capacity, because of the fact that when said sleeve 9 is in any such intermediate position, the rotor vanes 24 and 25 will at all times be spaced a sufficient distance from the inner wall of said sleeve, during rotation of the rotor, to enable by-passing of a certain amount of fluid.

As the degree of rotation of the sleeve 9, from its neutral position toward the position 135 degrees therefrom, is increased, the pressure output will be accordingly increased. This is on account of the fact that during rotation of the sleeve 9, in either direction from its neutral position toward a position 135 degrees therefrom, the eccentricity of the shaft 20, respecting the wall of the chamber 11 of the sleeve 9 is gradually and continuously increased, until the full degree of eccentricity is effected, respecting the shaft 20, when the sleeve 9 has been rotated 135 degrees, or thereabout, in either direction from its neutral position.

It will thus be seen that as the eccentricity of the shaft 20, respecting the inner wall of the chamber 11 of the sleeve 9, is increased by rotation of the sleeve 9 in either direction from its neutral position, that the pressure output will accordingly be increased because of the increasing proximity of the vanes 24 and 25 of the rotor 21 to the inner wall of the chamber 11 of the sleeve 9.

Thus, by employment of the construction of control means of the present invention, any degree of pressure output between zero and maximum capacity, may be effected by rotation of the sleeve 9 in either direction from its neutral position to a position 135 degrees therefrom. The increase or decrease of pressure output, effected by rotation of the sleeve 9 away from or toward its neutral position, is gradual and smooth, yet positive and swift, thus eliminating sudden pulsations or surges respecting pressure output incident to the use control means heretofore proposed.

It will be seen that in the construction of control means of the present invention, the control sleeve is at all times supported respecting its housing by bearings providing as nearly as possible equalized support in all directions. The construction is so designed also as to enable a condition of equalized fluid pressure from within and without the control sleeve and toward either side of each of the sealing bearing gears assisting in the supporting of said control sleeve.

It will, of course, be understood that the pump or motor forming a part of the unit A, and described in Figures 2, 3, 4, 6, 7, 8, 9 and 10, may be employed without reference to the control means described in connection therewith, but may, if desired, be employed in connection with any suitable control means.

Figure 5:
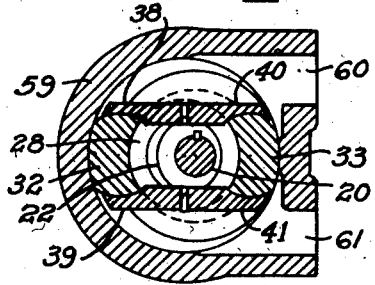
Figure 5 is a transverse sectional view of a modified pump or motor unit of the present invention, which in the system diagrammatically shown in Figure 1 comprises a driven unit.

It will be apparent to those skilled in the art that said pump or motor unit comprising the rotor 21, pistons 32 and 33, piston carriages 38, 39, 40 and 41, and the floating placement rings 28 and 29, may be incorporated in a suitable housing, such as that indicated in Figure 5, instead of being mounted as described within the chamber 11 of the sleeve 9. In other words, the pump or motor parts just mentioned may be substituted for those now to be described in connection with the unit B of the transmission system diagrammatically shown in Figure 1.

The motor parts now to be described in connection with unit B are substantially the same as those previously described in connection with unit A, except that the placement means for the pistons have been somewhat modified in respect to the motor unit B. The parts of said latter unit which are the same as above described in connection with unit A will not be specifically described.

Referring more particularly now to Figures 12 to 15, in which the modification above mentioned is shown, the same reference characters used in connection with Figures 1 to 10 will be employed to refer to like parts in Figures 12 to 15.

The motor unit, now to be described, comprises a housing, designated 59, having the inlet-outlet ports 60 and 61, communicating with a central cylindrical chamber 62. The motor shaft 20ª is journaled in the housing 59 upon bearings 46 and 47 in the same manner as the shaft 20 is journaled in the housing 4 of unit A. The shaft 20ª is journaled in the housing 59 in such a manner as to be positioned eccentrically respecting the wall 62ª of the cylindrical chamber 62. The pistons 32 and 33 are associated with their respective piston carriages 38, 39 and 40, 41 in the same manner as described in connection with unit A, and said carriages are associated with the rotor 21, likewise in a similar manner to that previously described, the lugs 43 and 44 of said piston carriages engaging between them the lateral extensions 23 of the rotor hub 22.

Instead of the placement rings 28 and 29, described in connection with unit A, placement discs 63 and 64 have been substituted therefor. The placement discs 63 and 64 are provided with eccentrically positioned openings 65 and said discs are securely fastened to the end plates 66 and 67 of said housing 59 by means of bolts 68 and 69 passing through corresponding openings in said discs and said end plates. The shaft 20ª is journaled in the opening 65 of said discs as well as in the end plates 66 and 67 of the housing 59.

Since the surfaces 35 of the pistons 32 and 33 have the curvature of arcs of a circle of substantially the same diameter as the periphery 64ª of the placement discs 63 and 64, said pistons ride about the peripheries of said discs 63 and 64 with their surfaces 35 in full contact with the peripheries of said discs during all phases of rotation of the rotor 21.

The eccentric discs 63 and 64 are secured to their respective end plates 66 and 67 in such a manner that the eccentric openings therein are positioned eccentrically respecting the discs in the same direction that the shaft 20ª is eccentric respecting the chamber 62. In other words, the eccentric discs are so secured to their respective end plates that the openings 65 are off center to the same degree, and in the same direction, as the shaft 20ª is off center respecting the wall 62ª of the chamber 62.

Figure 13:
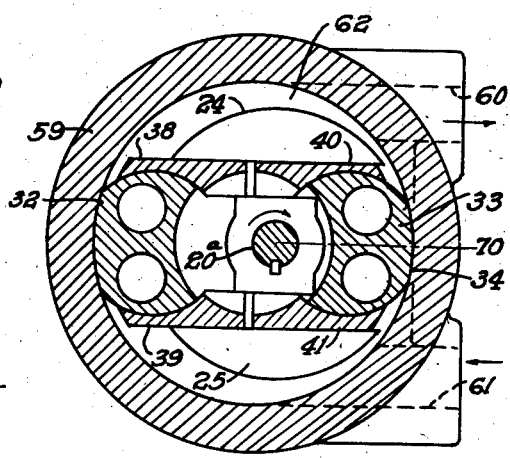
Figure 13 is a view similar to Figure 12, but showing the moving parts in a different position.
Figure 14:
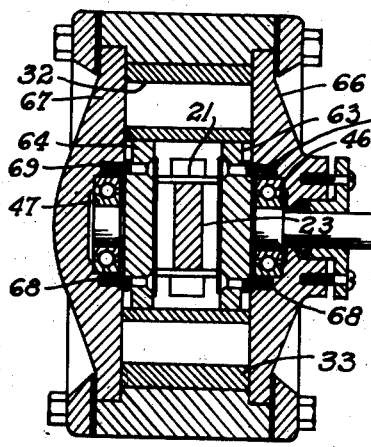
Figure 14 is a longitudinal sectional view on the line 14—14 of Figure 12.
Figure 15:
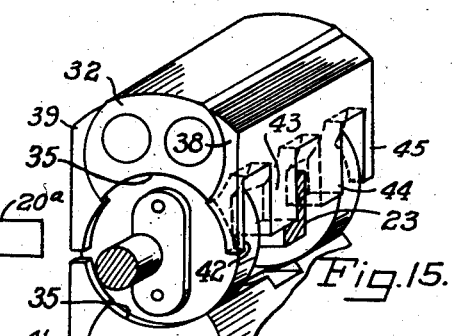
Figure 15 is a perspective view showing the relation of the pistons, piston carriages, placement discs, and rotor of the modified pump or motor construction disclosed in Figures 12 to 14.
Figures 16, 17:
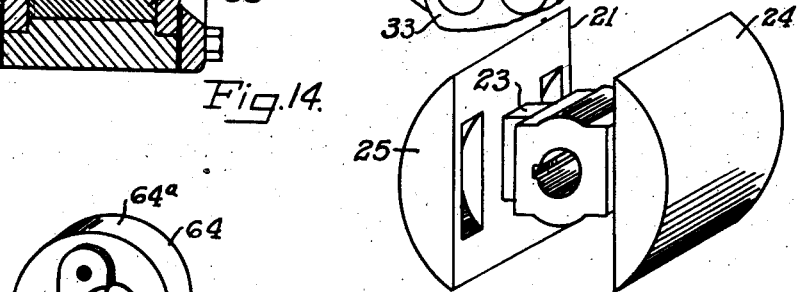
Figure 16 is a perspective view of one of the placement discs of the modified pump or motor construction disclosed in Figures 12 to 14.
Figure 17 is a perspective view of the rotor employed in the modified pump or motor construction disclosed in Figures 12 to 14.

Thus it will be seen that when the pistons, during the course of the rotation of the rotor 21, are in the position indicated by Figure 13, said pistons and their respective piston carriages will have been shifted respecting the rotor in a leftward direction, having reference to Figure 13. In other words, at the position of rotation of the rotor 21, shown in Figure 13, the piston 32 and its cooperating piston carriages 38 and 39, will be shifted away from the center of the rotor, and correspondingly the piston 33 and its associated piston carriages 40 and 41, will be shifted toward the center of the rotor.

Figure 12:
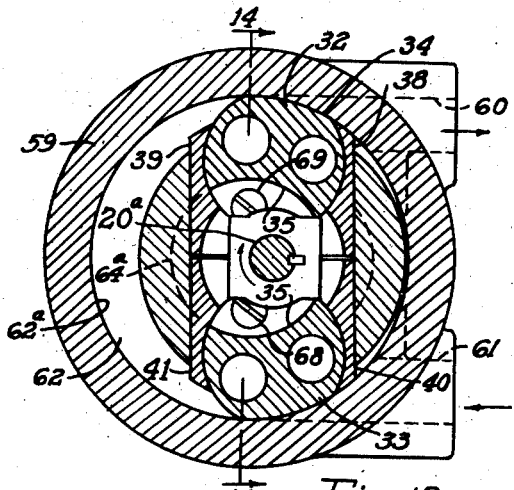
Figure 12 is a transverse sectional view of a modified pump or motor unit of the present invention, which, in the system disclosed in Figure 1, comprises a driven unit.

In operation, assuming the shaft 20ª to be rotated in a clockwise direction respecting Figures 12 and 13, fluid will be drawn into the chamber 62 through the inlet-outlet port 61 and exhausted through the inlet-outlet port 60. This is due to the fact that the nearest point on the wall 62ª of the chamber 62 to the center of the shaft 20ª is a point midway between the inlet-outlet ports 60 and 61, as indicated by the dotted line 70. Thus when the piston 32 or 33 approaches the point in the course of the rotation of the rotor at which the line 70 would pass through its center, said piston will be contracted toward the center of the rotor so that the outer surface 34 of said piston forms substantially a continuation of the arc formed by the curved surfaces of the vanes 24 and 25.

Consequently the volume of fluid in front of the piston 32 or 33, when the same approaches the point indicated by the line 70, will be substantially negligible, while the volume of fluid in front of the opposite piston 32 or 33, approaching the inlet-outlet port 60, will be comparatively great. For this reason, the fluid will be caused to be exhausted through the inlet-outlet port 60 and to be returned through the inlet-outlet port 61, to the chamber 62 where it will be picked up by the next approaching piston 32 or 33.

Conversely, when the shaft 20ª is caused to rotate in a counterclockwise direction, respecting Figures 12 and 13, the direction of fluid flow through the housing 59 will be reversed, so that fluid will be exhausted through the inlet-outlet port 61 and returned to the chamber 62 through the inlet-outlet port 60.

The construction of pump or motor just described is extremely rigid and substantial, providing long leverage through the association of the piston carriages 38, 39, 40 and 41 through the cooperation of the lugs 43 and 44 thereof with the lateral extensions 23 of the rotor hub. Very positive action in reference to the shifting of the pistons 32 and 33, respecting the center of the shaft 20ª, is provided by their following of the eccentric discs 63 and 64 secured to the housing 59, making the motor parts capable of higher speed and of delivering greater volume. This is important since it increases the capacity of a smaller unit. At the same time by the construction of the parts, the element of friction is substantially reduced.

While it will be obvious that the motor parts described in connection with either of the units A or B will have substantial utility as pumps or motors for use in conjunction with control means of other types besides that described in connection with unit A, the construction of motor unit therein described has been designed particularly for use with such control means, having reference particularly to the employment of the floating placement rings 28 and 29. A construction involving the employment of floating rings has been found desirable to use in connection with control means such as herein described, because of the necessity for shifting the rotor eccentrically in accordance with different degrees of rotation of the control sleeve 9. Because of the varying degrees of eccentricity of the rotor respecting the chamber 11 of the sleeve 9, the means co-acting with the pistons to maintain the same engaged with the walls of said sleeve, are practically required to be flexible or floating, or at least not securely fixed to any relatively stationary part.

On the other hand, the construction involving the employment of the stationary eccentric discs or followers 63 and 64 is deemed preferable in many instances where the motor unit is to be used as a driven unit, as, for instance, the driven unit B in the system diagrammatically shown in Figure 1, or where the motor unit is to be used with exterior fluid control means other than that described in connection with unit A. For such uses, the construction employing stationary eccentric discs has certain advantages in sturdiness and positiveness of action permitting greater output and higher speeds.

Having thus described my invention, what I claim as new and desire to secure by Letters Patent of the United States is:

1. Apparatus of the class described, comprising, in combination, a housing having a plurality of ports therein, a sleeve rotatable within said housing and having a plurality of ports therein providing fluid communication between said housing ports, and a plurality of members cooperating with said housing and said sleeve and movable to different positions respecting the sleeve and the housing for rotatably supporting said sleeve in spaced relation to said housing, said members having fluid tight cooperation with the housing and the sleeve whereby to prevent the flow of fluid past said members intermediate the sleeve and housing and thereby direct the flow of fluid through said housing or neutralize said flow in accordance with the position of said sleeve ports respecting the same, and rotary pumping means within the interior of said sleeve, said pumping means and said interior being so constructed and arranged with respect to each other that in certain rotative positions of said sleeve low fluid pressure is produced within said sleeve on the side of said interior which is in communication with one of said sleeve ports and high fluid pressure is produced on the side of said interior which is in communication with another of said sleeve ports, said two sides of said interior being continuously cut off from communication with each other by said pumping means, and in other rotative positions of said sleeve. said sleeve ports are reversed as to communication with said high and low pressure sides of said interior.

2. Apparatus of the class described, comprising, in combination. a housing having a plurality of ports therein, a sleeve rotatable within said housing and having a plurality of ports therein providing fluid communication between said housing ports, and a plurality of members cooperating with said housing and said sleeve and movable to different positions respecting the sleeve and the housing for rotatably supporting said sleeve in spaced relation to said housing, said members having fluid tight cooperation with the housing and the sleeve whereby to prevent the flow of fluid past said members intermediate the sleeve and housing and thereby direct the flow of fluid through said housing or neutralize said flow in accordance with the position of said sleeve ports respecting the same, said members being so positioned relative to each other as to provide substantially equalized support for said sleeve under all conditions of rotation of the latter, and rotary pumping means within the interior of said sleeve, said pumping means and said interior being so constructed and arranged with respect to each other than in certain rotative positions of said sleeve low fluid pressure is produced within said sleeve on the side of said interior which is in communication with one of said sleeve ports and high fluid pressure is produced on the side of said interior which is in communication with another of said sleeve ports, said two sides of said interior being continuously cut off from communication with each other by said pumping means, and in other rotative positions of said sleeve, said sleeve ports are reversed as to communication with said high and low pressure sides of said interior.

3. Apparatus of the class described, comprising, in combination, a housing having a plurality of ports therein, a sleeve rotatable within said housing and having a plurality of ports therein providing fluid communication between said housing ports, a plurality of gear members co-opertaing with said housing and said sleeve for rotatively supporting the sleeve in spaced relation to said housing, certain of said members having fluid tight connection with the housing and said sleeve whereby to prevent the flow of fluid past said members intermediate the sleeve and housing and thereby direct the flow of fluid in one of plural directions through said housing or neutralize the flow of fluid therethrough dependent upon the rotative position of said sleeve respecting said housing and the corresponding position of said members relative to said sleeve ports, and rotary pumping means within the interior of said sleeve, said pumping means and said interior being so constructed and arranged with respect to each other that in certain rotative positions of said sleeve low fluid pressure is produced within said sleeve on the side of said interior which is in communication with one of said sleeve ports and high fluid pressure is produced on the side of said interior which is in communication with another of said sleeve ports. said two sides of said interior being continuously cut off from communication with each other by said pumping means, and in other rotative positions of said sleeve, said sleeve ports are reversed as to communication with said high and low pressure sides of said interior.

4. Apparatus of the class described, comprising, in combination, a housing having a plurality of ports therein, a sleeve rotatable within said housing and having a plurality of ports therein providing fluid communication between said housing ports, a plurality of gear members cooperating with said housing and said sleeve for rotatively supporting the sleeve within said housing, certain of said members being movable relative to other of said members, and certain of said members having fluid tight connection with the housing and said sleeve whereby to prevent the flow of fluid past said members intermediate the sleeve and housing and thereby direct the flow of fluid through said housing or neutralize the flow of fluid therethrough dependent upon the rotative position of said sleeve respecting said housing and the corresponding position of said members relative to said sleeve ports, and rotary pumping means within the interior of said sleeve, said pumping means and said interior being so constructed and arranged with respect to each other that in certain rotative positions of said sleeve low fluid pressure is produced within said sleeve on the side of said interior which is in communication with one of said sleeve ports and high fluid pressure is produced on the side of said interior which is in communication with another of said sleeve ports, said two sides of said interior being continuously cut off from communication with each other by said pumping means, and in other rotative positions of said sleeve. said sleeve ports are reversed as to communication with said high and low pressure sides of said interior.

5. Apparatus of the class described, comprising, in combination, a housing having a plurality of ports therein, a sleeve rotatable within said housing and having a plurality of ports therein providing fluid communication between said housing ports, a plurality of gear members cooperating with said housing and said sleeve for rotatively supporting the sleeve in spaced relation to said housing, certain of said members being movable relative to other of said members, said relatively movable members having fluid tight cooperation with said housing and said sleeve whereby to prevent the flow of fluid past said relatively movable members intermediate the sleeve and housing and thereby direct the flow of fluid in one of a plural directions through said housing or neutralize the flow of fluid therethrough dependent upon the rotative position of said sleeve respecting said housing and the corresponding position of said relatively movable members relative to said sleeve ports, and rotary pumping means within the interior of said sleeve, said pumping means and said interior being so constructed and arranged with respect to each other that in certain rotative positions of said sleeve low fluid pressure is produced within said sleeve on the side of said interior which is in communication with one of said sleeve ports and high fluid pressure is produced on the side of said interior which is in communication with another of said sleeve ports, said two sides of said interior being continuously cut off from communication with each other by said pumping means, and in other rotative positions of said sleeve, said sleeve ports are reversed as to communication with said high and low pressure sides of said interior.

6. Apparatus of the class described, comprising, in combination, a housing having a plurality of ports therein, a sleeve rotatable within said housing and having a plurality of ports therein providing fluid communication between said housing ports, a plurality of gear members cooperating with said housing and said sleeve for rotatively supporting the sleeve in spaced relation to said housing, certain of said members having fluid tight connection with the housing and said sleeve whereby to prevent the flow of fluid past said members intermediate the sleeve and housing and thereby direct the flow of fluid in one of plural directions through said housing or neutralize the flow of fluid therethrough dependent upon the rotative position of said sleeve respecting said housing and the corresponding position of said members relative to said sleeve ports, one of said members having a fixed position respecting the housing and being rotatable relative thereto to cause rotation of said sleeve, and rotary pumping means within the interior of said sleeve, said pumping means and said interior being so constructed and arranged with respect to each other that in certain rotative positions of said sleeve low fluid pressure is produced within said sleeve on the side of said interior which is in communication with one of said sleeve ports and high fluid pressure is produced on the side of said interior which is in communication with another of said sleeve ports, said two sides of said interior being continuously cut off from communication with each other by said pumping means, and in other rotative positions of said sleeve, said sleeve ports are reversed as to communication with said high and low pressure sides of said interior.

7. Apparatus of the class described, comprising in combination, a housing having a plurality of ports therein, a sleeve rotatable within said housing and having a plurality of ports therein providing fluid communication between said housing ports through said sleeve, means intermediate the housing and the sleeve for rotatably supporting the latter in spaced relation to said housing whereby fluid will pass through the space between the housing and the sleeve in flowing between the housing ports, said means comprising members having fluid tight cooperation with said housing and said sleeve and so constructed and arranged as to prevent flow of fluid past said members in said space, said members being movable to different positions in said space relative to said sleeve ports upon rotation of the sleeve whereby the direction of fluid flow and the volume of fluid permitted to flow between the housing ports will be varied according to the relative positions of said members and said sleeve ports, and rotary pumping means within the interior of said sleeve, said pumping means and said interior being so constructed and arranged with respect to each other that in certain rotative positions of said sleeve low fluid pressure is produced within said sleeve on the side of said interior which is in communication with one of said sleeve ports and high fluid pressure is produced on the side of said interior which is in communication with another of said sleeve ports, said two sides of said interior being continuously cut off from communication with each other by said pumping means, and in other rotative positions of said sleeve, said sleeve ports are reversed as to communication with said high and low pressure sides of said interior, the periphery of said sleeve and the inner wall of said housing being provided with gear teeth and said members comprising a plurality of gear members, each of said gear members meshing with the gear teeth on the housing and the sleeve.

8. Apparatus of the class described, comprising in combination, a housing having a plurality of ports therein, a sleeve rotatable within said housing and having a plurality of ports therein providing fluid communication between said housing ports through said sleeve, means intermediate the housing and the sleeve for rotatably supporting the latter in spaced relation to said housing whereby fluid will pass through the space between the housing and the sleeve in flowing between the housing ports, said means comprising members having fluid tight cooperation with said housing and said sleeve and so constructed and arranged as to prevent flow of fluid past said members in said space, said members being movable to different positions in said space relative to said sleeve ports upon rotation of the sleeve whereby the direction of fluid flow and the volume of fluid permitted to flow between the housing ports will be varied according to the relative positions of said members and said sleeve ports, and rotary pumping means within the interior of said sleeve, said pumping means and said interior being so constructed and arranged with respect to each other that in certain rotative positions of said sleeve low fluid pressure is produced within said sleeve on the side of said interior which is in communication with one of said sleeve ports and high fluid pressure is produced on the side of said interior which is in communication with another of said sleeve ports, said two sides of said interior being continuously cut off from communication with each other by said pumping means, and in other rotative positions of said sleeve, said sleeve ports are reversed as to communication with said high and low pressure sides of said interior, the periphery of said sleeve and the inner wall of said housing being provided with gear teeth and said members comprising sealing gear members normally positioned adjacent the sleeve ports in such a manner that fluid may flow through said sleeve ports to either side of said members, the said members being movable in one direction or the other relative to said sleeve ports upon rotation of the sleeve for preventing flow of fluid from the sleeve in the direction toward which said members are moved, said gear members meshing with the gear teeth on the housing and the sleeve.

9. Apparatus of the class described, comprising in combination, a housing having a plurality of ports therein, a sleeve rotatable within said housing and having a plurality of ports therein providing fluid communication between said housing ports through said sleeve, means intermediate the housing and the sleeve for rotatably supporting the latter in spaced relation to said housing whereby fluid will pass through the space between the housing and the sleeve in flowing between the housing ports, said means comprising members having fluid tight cooperation with said housing and said sleeve and so constructed and arranged as to prevent flow of fluid past said members in said space, said members being movable to different positions in said space relative to said sleeve ports upon rotation of the sleeve whereby the direction of fluid flow and the volume of fluid permitted to flow between the housing ports will be varied according to the relative positions of said members and said sleeve ports, and rotary pumping means within the interior of said sleeve, said pumping means and said interior being so constructed and arranged with respect to each other that in certain rotative positions of said sleeve low fluid pressure is produced within said sleeve on the side of said interior which is in communication with one of said sleeve ports and high fluid pressure is produced on the side of said interior which is in communication with another of said sleeve ports, said two sides of said interior being continuously cut off from communication with each other by said pumping means, and in other rotative positions of said sleeve, said sleeve ports are reversed as to communication with said high and low pressure sides of said interior, the periphery of said sleeve and the inner wall of said housing being provided with gear teeth and said members comprising sealing gear members normally positioned adjacent the sleeve ports in such a manner that fluid may flow through said sleeve ports to either side of said members, the said members being movable in one direction or the other relative to said sleeve ports upon rotation of the sleeve for preventing flow of fluid from the sleeve in the direction toward which said members are moved, said means comprising other gear members normally positioned at diametrically opposite sides of the sleeve and each of which is normally equidistantly spaced from the sealing gear members when the latter are in their normal positions, one of said other gear members being operable from outside of the housing for rotating said sleeve.

MAX C. WHITMORE.